Figure 1:
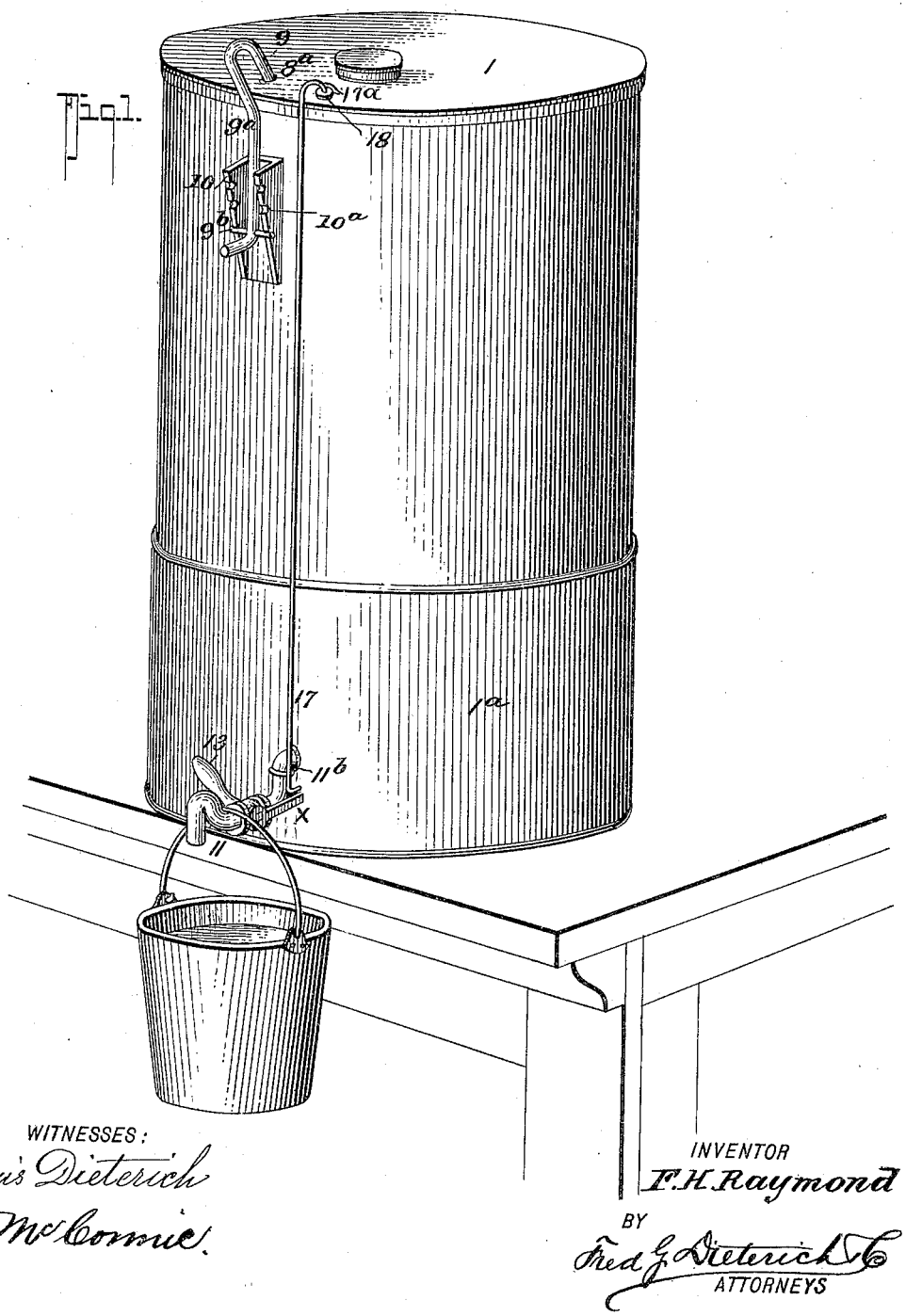

No. 684,719. Patented Oct. 15, 1901.
F. H. RAYMOND.
MEASURING LIQUID DISPENSING VESSEL.
(Application filed Apr. 3, 1900.)
(No Model.) 3 Sheets—Sheet 1.

WITNESSES:
Louis Dieterich
E. McCormic.

INVENTOR
F. H. Raymond
BY
Fred G. Dieterich & Co.
ATTORNEYS

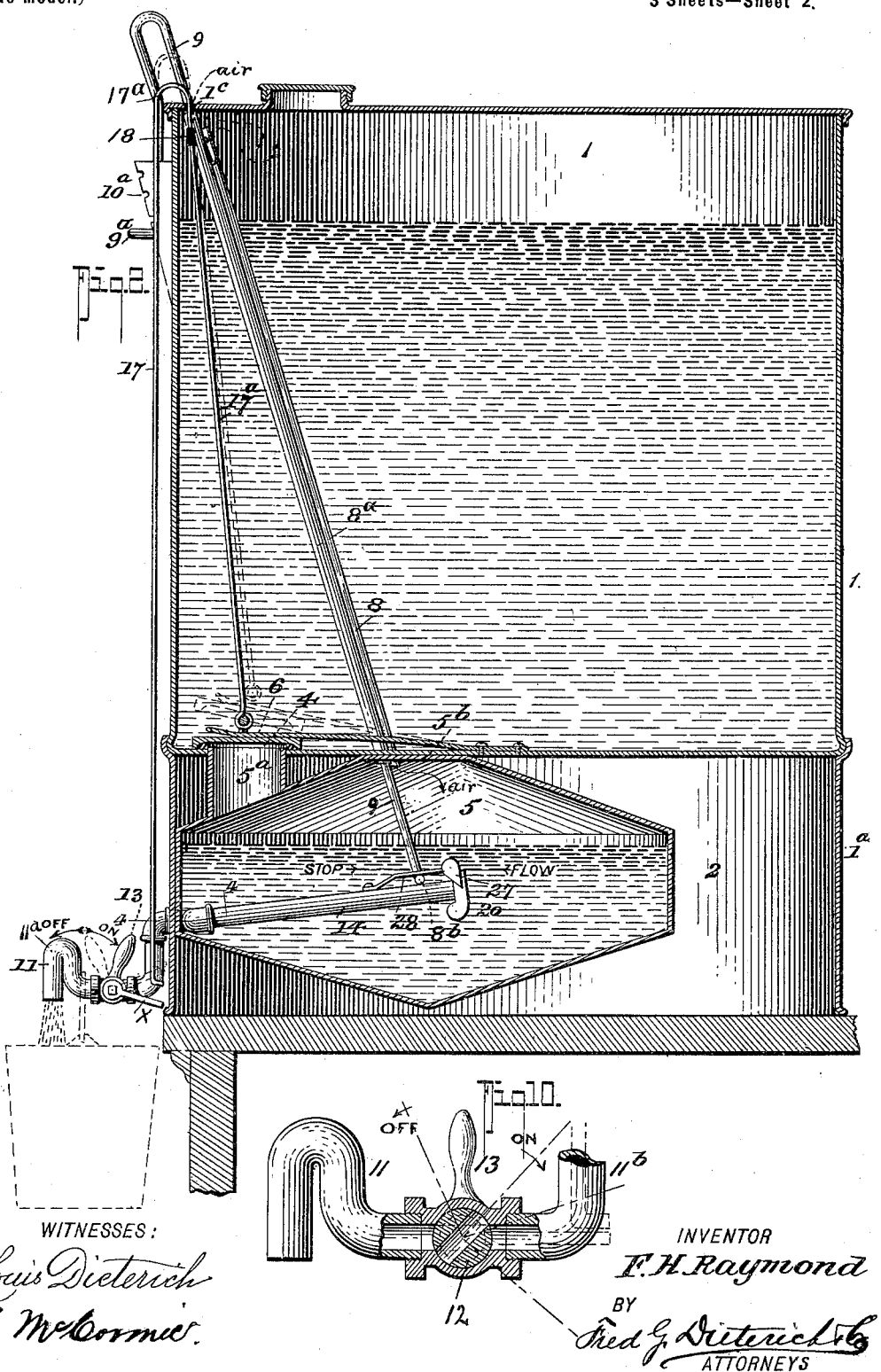

No. 684,719. Patented Oct. 15, 1901.
F. H. RAYMOND.
MEASURING LIQUID DISPENSING VESSEL.
(Application filed Apr. 3, 1900.)
(No Model.) 3 Sheets—Sheet 3.
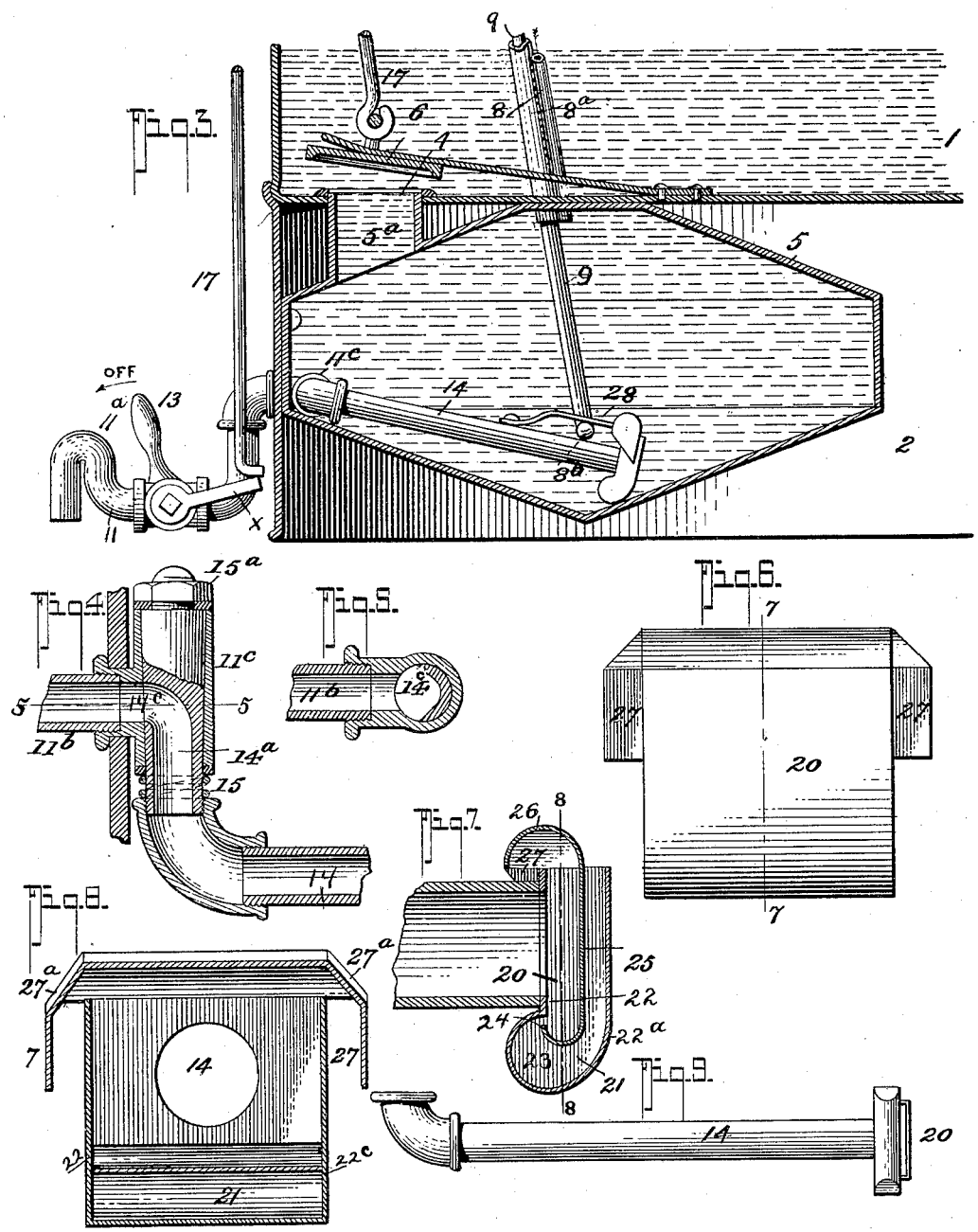
WITNESSES:
Louis Dieterich
E. McCormie
INVENTOR
F. H. Raymond
BY
Fred G. Dieterich & Co.
ATTORNEYS

UNITED STATES PATENT OFFICE.

FRANK H. RAYMOND, OF MEADVILLE, PENNSYLVANIA.

MEASURING LIQUID-DISPENSING VESSEL.

SPECIFICATION forming part of Letters Patent No. 684,719, dated October 15, 1901.

Application filed April 3, 1900. Serial No. 11,336. (No model.)

*To all whom it may concern:*

Be it known that I, FRANK H. RAYMOND, residing at Meadville, in the county of Crawford and State of Pennsylvania, have invented certain new and useful Improvements in Self-Measuring Liquid-Dispensing Vessels, of which the following is a specification.

This invention relates to improvements in that class of liquid-dispensing vessels having self-measuring means whereby predetermined measures or quantities less than or equal to that contained in the vessel can be readily drawn off without the aid of detached measuring-cups and without wastage or evaporation.

My invention in its general nature comprehends a main reservoir or storage-tank and a measuring vessel supported in close relation to or upon the main reservoir and having direct communication therewith through the medium of a feed-aperture normally held closed by an automatically-closing valve mechanism, the proper manipulation of which governs the supply to the measuring vessel, an offtake-pipe being also connected with the measuring vessel, the inlet end of which communicates with the combined drawing-off measuring-tube arranged to be operated from the exterior of the entire apparatus and adapted when set to the desired position to lead off the predetermined amount of fluid from the measuring vessel to the discharge-faucet.

In its more complete construction my invention also includes a simple, novel, and easily-manipulated means for opening the valve for the feed-port that connects the main reservoir and the measuring-compartment capable of being set from the outside by manipulating the faucet-handle and without affecting during such operation the position of the drawing-off tube within the said holding or measuring compartment.

My invention also seeks to provide a simplified and positively-operating means for regulating the vent or air-opening to the storage-reservoir simultaneously with the operation of setting the valve that closes the discharge-opening of the said reservoir to the receiving or measuring compartment.

In its subordinate features my invention embodies certain details of construction and novel combination of parts, all of which will hereinafter be fully explained, and specifically pointed out in the appended claims, reference being had to the accompanying drawings, in which—

Figure 1 is a perspective view of my improved liquid-dispensing apparatus. Fig. 2 is a vertical section of the same, the drawing-off tube being shown swung up to lead off a predetermined quantity of the fluid, the manner in which the cut-off valve that governs the port from the reservoir to the measuring-receptacle is opened being shown in dotted lines. Fig. 3 is a detail section of the lower part of the reservoir and the measuring-receptacle, the parts being in their normal or closed position. Fig. 4 is a detail horizontal section taken practically on the line 4 4 of Fig. 2. Fig. 5 is a cross-section on the line 5 5 of Fig. 4. Fig. 6 is a front view, and Fig. 7 is a cross-section on the line 7 7 of Fig. 6, of the hood or receiving end of the drawing-tube. Fig. 8 is a front or sectional elevation of the same, taken practically on the line 8 8 of Fig. 7. Fig. 9 is a detail view of the drawing-tube detached, and Fig. 10 is an enlarged sectional view of the faucet and its controlling-valve.

Referring now to the accompanying drawings, in which like characters indicate like parts in all the figures, 1 designates the storage tank or reservoir, adapted to hold a large quantity of liquid. This reservoir may be made of any desired shape in horizontal section, but is preferably circular, as shown, and at the upper end it has a suitably-capped filling-opening. The side walls $1^a$ of the lower end of the reservoir are extended to form a support for the upper part and also form the exterior of the bottom chamber 2, in which the measuring vessel or receptacle 5 is held.

The storage tank or reservoir 1 has a discharge-opening 4 near one edge, that discharges into the neck or cupola portion $5^a$ of the measuring vessel 5, and the said opening 4 is normally held closed by a spring-actuated valve 6, said valve having a manually-operated means for opening it extended to the outside of the apparatus, as hereinafter described.

The measuring-receptacle 5 in horizontal section has a shape corresponding with that of the storage-tank 1, and the said vessel 5 in practice is made large enough to hold the maximum amount that a single customer is likely to buy.

The upper and lower ends of the vessel 5 are dish-shaped, and the crown of the upper part terminates in a central flat portion $5^b$, the object of which is twofold—first, it permits the receptacle 5 being brought up closely against the under side of the bottom of the tank 1, and, secondly, it provides a solid bearing-surface against which the hooded end of the drawing-tube is adapted to rest when the said tube is elevated to its highest point.

The front side of the receptacle 5 is supported upon the bottom extension of the apparatus and is made fast to the same in any approved manner.

A vent-tube 8 extends up from the receptacle 5 to a point near the top of the reservoir 1, and the said tube 8 has a supplemental guide portion $8^a$, which serves as a guideway for the combined lift and measure-regulating rod 9, the lower end of which connects with the drawing-tube, presently referred to, the upper end of the said rod projecting above the reservoir or tank 1, and the said end terminates in a pendent spring-latch $9^a$, the lower end of which has a detent $9^b$, adapted to be moved into engagement with any one of the series of notches $10^a$, formed upon the indicator-plate 10, secured upon the front face of the apparatus, as clearly shown in Fig. 1, the said notches being suitably numbered as desired—for example, one to five—to designate the number of pints, quarts, or gallons at which the drawing-off tube within the measuring-receptacle 5 is set to permit the drawing off of a predetermined quantity of the liquid from the receptacle 5 when the outlet-faucet 11 is open.

The drawing-off tube 14 has for its purpose to determine the level or quantity of liquid to be drawn from the receptacle 5, and for such purpose it has a pivotal connection with the faucet 11, with which, however, in all of its adjustments, up or down, it is always in open communication.

To provide a simple and effective means for joining the tube 14 with the faucet 11, the said tube has an angle extension $14^a$, held fluid-tight within the socketed end $11^c$ of the extension $11^b$, which forms a part of the faucet 11 and which passes through the front wall of the apparatus, as shown. The extension $14^a$ also has a suitably-formed outlet $14^c$, which maintains the open communication between the faucet 11 and the tube 14 during the different adjustments of the said tube 14. The end $11^b$ of the faucet is detachably secured in the head $11^c$ of the faucet to facilitate assembling the several parts, and to further hold the said parts in a fluid-tight condition and also permit of their being easily detached the end $14^a$ of the drawing-tube is held spring-pressed in engagement with the bore of the head $11^c$ through the medium of the spring 15. It should be stated that the port $14^a$, that is secured to the tube 14, forms a hinge or fulcrum upon which the tube 14 swings, and it will be seen by reference to Figs. 4 and 5 that the member $14^a$ has its feed-opening $14^c$ so formed that the said opening will at all times be in communication with the faucet member $11^b$. The faucet 11 has the usual gooseneck $11^d$ and a valve 12, which in my construction is also provided with a crank-arm $x$, that extends inwardly under and in close proximity with the lower end of the lift-rod 17, with which the crank-arm $x$ engages and which is moved up by the said arm when the faucet-handle 13 is turned to "off" position, as indicated in dotted lines in Fig. 2. The lift-rod 17 extends up on the outside of the body of the apparatus, its upper end being bent down and projected through a vent-aperture $1^c$ in the top of the tank 1, the lower end of said downwardly-bent portion being adapted for engaging the spring-actuated valve 4. The portion $17^a$ of the rod 17 has a plug-valve 18, located under the top of the reservoir 1, which valve when the rod 17 is at its normal or elevated position—that is, when the faucet 11 is turned off—fits within the vent-aperture $1^c$ in the top of the reservoir, and thereby keeps the said reservoir and receptacle 5 air-tight and prevents the escape of the fluid from the reservoir by evaporation.

By providing a valve mechanism for regulating the flow of the liquid from the reservoir 1 and the receptacle 5, as stated, it will be readily apparent that the operator as he turns off the faucet 11 will simultaneously lift the rod 17 and cause the plug-valve 18 thereon to engage and close off the vent $1^c$ and at the same time lift the valve 4 and open up communication between the reservoir 1 and the receptacle 5, the air from the receptacle 5 at this time passing through a convenient tube, presently described, into the reservoir 1 at a point above its liquid-level. By turning the faucet-handle 13 to an open position the rod 17 by reason of such movement and the back thrust of the spring that holds the valve 4 down will be pulled down, and thereby move the plug 18 out of engagement with the vent $1^c$ and allow air to enter into the tank 1 above the fluid-level for the purposes that will hereinafter appear.

The inlet end of the drawing-off tube 14 has a hood portion 20, the construction of which is shown in detail in Figs. 6 to 8, by reference to which it will be seen that the same consists in a vertical chamber 21, formed between the inner and outer walls 22 $22^a$, and the lower end of said chamber ends in a scroll-like portion 23 and communicates with the tube 14 through the opening 24, as shown. The chamber 21 is divided into an inner and an outer compartment by a central division-plate 25, that extends down nearly to the crown of the scroll or cap portion, and the upper end of the said plate 25 projects above the upper edge of the chamber 21 and terminates with the inwardly-projecting hood 26, the lower end of which lies in a plane just above the upper edge of the chamber 21. The inlet end of the tube 14 communicates with the inner compartment of the chamber 21, and the side wall of the trough extends downward to form side extensions 27, which are open at the rear and closed at the top, as shown at 27$^a$.

By providing a hood or cut-off member of the character described the fluid will be kept from seeping into the tube 14 after it has been drawn off from the receptacle 5 down to the level of the upper edge of the front trough. As the said upper edge lies just above the lower or inlet edge of the top of the chamber 21, such arrangement of the upper edge, together with the side extensions 27, serves to keep the fluid from running into the inner compartment of the hood from the rear when the fluid is drawn down to the level, as before stated.

To provide for conveniently raising the tube 14, the rod 9 is connected therewith by a sliding joint, which consists of the rod 28, secured to the top of the tube 14, with its forwardly-projecting end held free, and with the said end the finger 8$^b$ of the rod 9 engages, it being understood that such form of connection is necessary by reason of the straightway lift of the rod 9 and the swing or arc movement of the tube 14.

From the foregoing description, taken in connection with the accompanying drawings, it is thought the operation and advantages of my invention will be readily understood.

To manipulate my improved apparatus, the operator first releases the end 9$^a$ of the lift-rod 9 from the indicator-plate 10 and sets the said rod in position to bring the tube 14 in a condition necessary to draw off the amount desired from the receptacle 5. The faucet-handle is then turned to an open position, and as the crank portion X thereof by reason of such movement moves away from the lower end of the rod 17 said rod will be pulled down by the spring-pressure of the valve 4, which then immediately closes and cuts off the reservoir 1 from the receptacle 5 and maintains such position during the time that the liquid is being drawn off from the said receptacle 5, it being understood that as the rod 17 is thus pulled down its plug or valve 18 will be drawn away from the vent 1$^c$, and thereby open up the atmosphere to the interior of the reservoir 1 and allow for the front entrance of the atmospheric pressure from the top of the reservoir down through the tube 8 of the receptacle 5 to provide for the free flow of the liquid therefrom. After the desired quantity has been drawn off the operator again moves the handle of the faucet 11 to a closure position, and as it is thus moved the crank portion X thereof will again engage the rod 17 and lift it to bring the plug 18 thereon to engage the vent 1$^c$ and simultaneously therefore close off the atmosphere from the reservoir 1 and open the valve 4 to allow the vessel 5 to be again filled from the reservoir 1, it being understood that as the tube 8 opens into the top of the reservoir 1 above its fluid-level the air within the receptacle 5 during the filling thereof will escape back into the top of the reservoir 1.

It will be understood that in the practical construction of the faucet 11 the same is so arranged that it will engage with the rod 17 and raise the valve 4 just after the opening from the discharge-pipe that leads off the fluid from the receptacle 5 has been closed. It will also readily be seen that by arranging the valve mechanism 4 and the connections that join it with the faucet 11 in the manner shown no special or extra manipulation of the faucet 11 is required to properly set the apparatus, for the reason that when the operator desires to draw off a given quantity of liquid from the said apparatus he merely turns the faucet 11, the manipulation of which prior to opening the discharge from the receptacle 5 will close the valve 4 and open a vent at the top of the reservoir 1, and thereby admit of the atmospheric pressure going down into the tube 8 from the receptacle 5 and provide for a free and uninterrupted flow of the liquid from the receptacle 5 so long as the faucet remains open.

In the use of my dispensing vessel the drafts can be made readily and unvarying and the receptacle 5 can be quickly recharged so long as there is any liquid remaining within the reservoir 1.

In the practical construction of my apparatus the same embodies but a very few parts, nearly all of which can be made up of sheet metal. The means for setting the drawing-off tube are separate or distinct from that which operate to open up the communication between the tank and the receptacle 5.

While the parts illustrated in the drawings bring out the principle of my invention, I desire it understood that the said parts may be modified or changed without departing from the scope of the appended claims.

Having thus described my invention, what I claim, and desire to secure by Letters Patent, is—

1. In a liquid-dispensing apparatus of the character described, the combination with the reservoir and the measuring-receptacle, said reservoir having a valved outlet discharging into the receptacle, the valve of which is automatically moved to its closed position and having a vent-aperture; of the lift-rod 17, said rod comprising a portion extending down into the reservoir and connected to the valve, and an outer portion projected outside the apparatus, and the plug 18, fixedly mounted on the rod 17 to engage the vent-aperture in the reservoir, as set forth.

2. In a liquid-dispensing apparatus, as described, the combination with the reservoir and the measuring-receptacle held in communication with the reservoir, an automatically-closing valve for shutting off the receptacle from the reservoir, means operated from the outside of the reservoir for opening the said valve; of the tube 8, the setting-rod 9, the drawing-off tube 14, and the discharge-faucet 11, communicating with the drawing-off tube, said rod 9 having a movable connection with the drawing-off tube 14, and projected up through the tube 8, all being arranged substantially as shown and described.

3. In an apparatus as described, the combination with the reservoir having a vent in the top, and an outlet at the bottom, a self-closing valve for said outlet, and the measuring-receptacle connected with the reservoir of the faucet 11, said faucet having a crank-arm, the lift-rod 17, said rod having a member extended within the reservoir and connected to the self-closing valve, and a member extended down in close relation to the faucet crank-arm, the plug 18, mounted on the rod, all being arranged substantially as shown, whereby a predetermined manipulation of the faucet-handle will lift the rod 17, and simultaneously close the reservoir-vent and open the self-discharging valve, as set forth.

4. An apparatus as described, comprising a reservoir mounted on a suitable base, said reservoir having a filling-opening at the top and a discharge-opening in its bottom, a self-closing valve for said discharge-opening; a measuring-receptacle supported under the reservoir to receive the liquid therefrom, said receptacle having a valved discharging-pipe and a drawing-off tube, said tube being pivotally connected to the valved discharging-pipe, a vent-tube projected up from the receptacle 5, into the top of the reservoir, and a setting-rod extended down through the tube and connected with the drawing-off tube, the upper end of the said setting-rod having a detent, and a graduated latch for holding the detent, all being arranged substantially as shown and described.

FRANK H. RAYMOND.

Witnesses:
  W. A. STORY,
  GEO. L. WILSON.